United States Patent [19]

Böhmler et al.

[11] Patent Number: 4,677,558
[45] Date of Patent: Jun. 30, 1987

[54] METHOD AND SYSTEM FOR CONTROLLING OPERATION OF AN APPARATUS OR ENGINE, PARTICULARLY INTERNAL COMBUSTION ENGINE

[75] Inventors: Heinz Böhmler, Pleidelsheim; Rolf Däumer, Weil der Stadt, both of Fed. Rep. of Germany

[73] Assignee: Robert Bosch GmbH, Stuttgart, Fed. Rep. of Germany

[21] Appl. No.: 692,381

[22] Filed: Jan. 17, 1985

[30] Foreign Application Priority Data

Mar. 3, 1984 [DE] Fed. Rep. of Germany ....... 3407920

[51] Int. Cl.⁴ ............................................. G06F 15/20
[52] U.S. Cl. ........................... 364/431.04; 364/431.12; 364/431.03; 364/900
[58] Field of Search .................. 364/431.03, 431.05, 364/431.04, 431.12, 424, 200, 900; 123/480

[56] References Cited

U.S. PATENT DOCUMENTS

| | | |
|---|---|---|
| 3,936,182 | 2/1976 | Sheikh . |
| 4,084,240 | 4/1978 | Lappington . |
| 4,204,256 | 5/1980 | Klotzner ................... 364/431.12 |
| 4,280,189 | 7/1981 | Takato et al. . |
| 4,376,428 | 3/1983 | Hata et al. ................. 364/431.04 |
| 4,414,665 | 11/1983 | Kimura et al. ................... 364/900 |
| 4,438,492 | 3/1984 | Hanmon, Jr. et al. ............. 364/900 |
| 4,475,493 | 10/1984 | Masteller et al. . |
| 4,604,711 | 8/1986 | Benn et al. .................... 364/424 |

FOREIGN PATENT DOCUMENTS

| | | | |
|---|---|---|---|
| 0159506 | 12/1979 | Japan .............................. 364/431.03 |
| 0183563 | 11/1982 | Japan .............................. 364/431.04 |
| 2100895 | 1/1983 | United Kingdom ............ 364/431.03 |

OTHER PUBLICATIONS

Kenneth Short, "Microprocessors and Programmed Logic", Aug. 1981, Prentice-Hall, pp. 119-123.
Bosch, "Combined Ignition & Fuel-Injection System'-'—Motronic Aug. '83, pp. 36-39.
"Relative Addressing of Data Sets" by R. Cook et al, IBM Technical Disclosure Bulletin, vol. 24, No. 1B; pp. 795-797, Jun. 1981.

*Primary Examiner*—Parshotam S. Lall
*Attorney, Agent, or Firm*—Frishauf, Holtz, Goodman & Woodward

[57] ABSTRACT

To permit change of data, to be used in a fixed program carried out by a microprocessor (1) in accordance with a stored program (2), upon change in operating characteristics of a controlled apparatus (M), for example an internal combustion engine, an erasable programmable read-only memory (3) is provided, which is external to the microprocessor (1). The external memory (3) forms a combined address and data memory having at least one address field (4), and a vector field (5). A constant data field (7) and a table, or function data field (6) are part of the external memory (3), which data fields contain data to be addressed directly through the address field or via the vector field for not only a single type or series of apparatus, such as ICEs, but also additional engines, or engine characteristics, for example due to aging. In order to run the program by the microprocessor 1, with a changed or aged engine, then, it is only necessary to change the address of the data in the data field and/or the vector field to provide different output data for any given programming step.

5 Claims, 2 Drawing Figures

METHOD AND SYSTEM FOR CONTROLLING OPERATION OF AN APPARATUS OR ENGINE, PARTICULARLY INTERNAL COMBUSTION ENGINE

Reference to related patent, the disclosure of which is hereby incorporated by reference: U.S. Pat. No. 4,084,240, Lappington (assigned Chrysler Corp.), Apr. 11, 1978.

Reference to related application, the disclosure of which is hereby incorporated by reference, assigned to the assignee of the present application: U.S. patent application Ser. No. 710,171, filed Mar. 11, 1985, Henn et al, claiming priority of German P 34 10 0822.

The present invention relates to a control system and control method, and more particularly to a system and method to control operation of an apparatus, such as an internal combustion engine or the like, utilizing a microprocessor having a read-only memory (ROM), especially an erasable programmable read-only memory (EPROM).

BACKGROUND

It has previously been proposed to electronically control the operation of internal combustion engines (ICEs), for example to control the ignition instant thereof, by utilizing a central microprocessor which provides an output signal precisely at the appropriate time to initiate an ignition spark, the time of initiation of the ignition spark being dependent on actual operating conditions of the ICE at that time. The referenced U.S. Pat. No. 4,084,240, Lappington, describes such a control system in which the microprocessor is connected to and associated with an electronically programmable read-only memory (EPROM). The EPROM has data stored therein which are specifically associated with the engine to be controlled, for example the specific model and type number of the engine. The control system thus will have data therein which are representative of the operating conditions or operating characteristics of one specific engine of an engine or engine type or series only. It is very difficult to adapt the program to changed operating conditions of the engine, for example operating conditions which require a different association of output data with input data representative of existing operating condition of the engine at any one period of time. To change the data in the EPROM of the system of the referenced patent, it is necessary to reprogram the entire EPROM, for example if the engine operates differently in different localities, depending, for example, on specific exhaust emission requirements or the like; the engine ages; or redesign of elements within the engine, even of a standard type or series, changes the respective operating characteristics of the engine under given operating conditions.

THE INVENTION

It is an object to facilitate precise match of the control system to specific engines without requiring reprogramming of an entire ROM or EPROM.

Briefly, the control system utilizes a ROM, or EPROM which may be part of the microprocessor or, preferably, is external thereto. The ROM forms a combined address and data memory having at least one address field connected to be addressed by the microprocessor in accordance with a basic program stored in an internal program memory of the computer. The ROM or EPROM, additionally, has a vector field, and at least one data field. The address field contains the addresses of at least one of: the vector field, and/or the data field. The vector field contains data addresses of the data in the data field, and the data field stores operating data specific to the operation of the apparatus at the respective addresses.

Modern ROMs can contain a substantial number of data and to match a specific engine to specific data outputs under specific operating conditions, it is then only necessary to change a few addresses or, at the most, a few data in the ROM or EPROM which, preferably, is external to the microprocessor itself. Complete reprogramming of the overall memory content which is stored in the ROM or EPROM usually is not necessary.

As an example: let it be assumed that the predetermined programming step is to be carried out with a different group of data then that originally contemplated. The programming step may, for example, be the addition of a constant. It will then only be necessary to store different constants which may be expected, and, for reprogramming, change the address of the specific constant which is required by changing the address in the address field, or in the vector field, so that the respective data addresses or target addresses, of the data to be recalled for a specific programming step, will be changed.

The system in accordance with the prior art would, however, require a complete reprogramming of the basic program, stored in a microprocessor. The programming memory of the microprocessor thus has to be reprogrammed by the manufacturer of the memory portions of the microprocessor program. This is very expensive. The present invention does have the advantage that the expensive portion, the microprocessor, can be made in large quantities and programmed once; the specific match to specific engine types can then be carried out by changing the addresses of the data to be recalled, without, however, changing the basic program of the microprocessor. Thus, substantial economies in manufacture can be expected, since the basic program remains unchanged.

In accordance with a preferred feature of the invention, the data field in the external ROM or EPROM is subdivided into a field containing constants, to receive and store specific data, for example constant factors, addition constants or the like, depending on requirements of users of the system, and, further, to have another data field which stores functional relationships, or functional characteristics, that is, graphs or tables which, for example, relate specific operating characteristics of the engine to then-existing operating conditions, for example the change in ignition timing of an ICE with change in its operating temperature. This arrangement then readily permits access to the data in the constant field by suitable addressing the data address in the constant field by the microprocessor itself, or, if desired, so arranging the microprocessor that the microprocessor retrieves the appropriate data address from the address field in the ROM or EPROM. Similarly, the data address of a specific functional characteristic, or functional relationship can be interrogated by the microprocessor.

In accordance with a preferred feature of the invention, the external memory has a vector field therein which is, first, indirectly addressed via the address field in the ROM or EPROM. The addresses stored in the vector field, which may also be defined as vector addresses, or vectors, simply, then direct the interrogation to the respective data addresses of the functional characteristic storage zone or storage field of the external memory. This arrangement permits storage of predetermined data in the data field and storage of the associated data addresses in the vector field. If it is desired, for example, to change the interrogation of the characteristics, for example, by providing an engine which has a different ignition timing-temperature characteristic than the one previously used, it is then only necessary to change the address in the vector field, that is, to interrogate a different vector address in order to retrieve a different functional relationship already stored in the ROM or EPROM, so that the microprocessor will then operate in accordance with a characteristic relationship stored in the new address. The program of the microprocessor itself, however, need not be changed. The most expensive portion of the control system, namely the microprocessor, thus can be made in large quantities, with one fixed program, and the specific run of the program can easily be changed to match specific operating apparatus in the example an ICE.

DRAWINGS

FIG. 1 is a highly schematic block diagram of the control system in accordance with the present invention, illustrated in connection with control of an internal combustion engine (ICE); and FIG. 2 illustrates the arrangement of the external ROM used in the system of FIG. 1.

DETAILED DESCRIPTION

Figure 1:
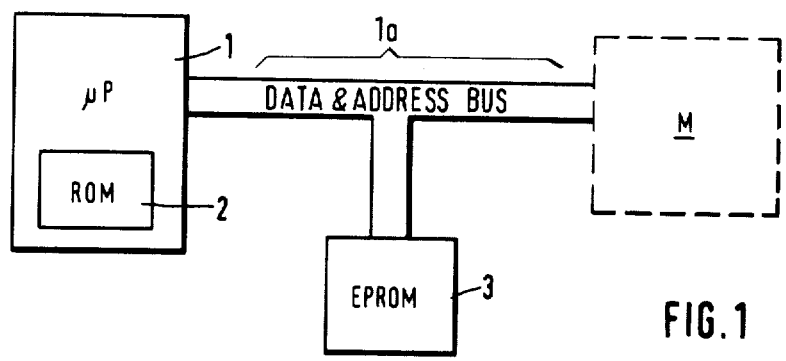

The basic block diagram illustrated in FIG. 1 is highly simplified and shows, in block form, those elements necessary for an understanding of the present invention. The structural elements themselves are all standard and articles of commerce.

A microprocessor 1 has an internal programming memory 2, shown as a read-only memory (ROM). The microprocessor 1 is connected over data and address buses, shown as a single data and address bus 1a to, on the one hand, an external memory, which preferably is an erasable programmable read-only memory (EPROM) 3. The data and address bus 1a, further, is connected to the utilization apparatus which is to be controlled, shown schematically as an internal combustion engine, or motor M. The internal programming memory 2, preferably and usually, is a pure ROM; the external memory 3 preferably is an erasable programmable ROM.

The program to control the operation of the ICE M and the data associated therewith are separately stored. In accordance with a feature of the invention, the overall or common programming portions to control the ICE M are stored in the internal memory 2. Specific operating characteristics and data, that is, characteristics and data which depend on a specific engine, are stored in the EPROM 3. The internal memory 2 and the external memory 3 each may comprise a memory chip.

Figure 2:
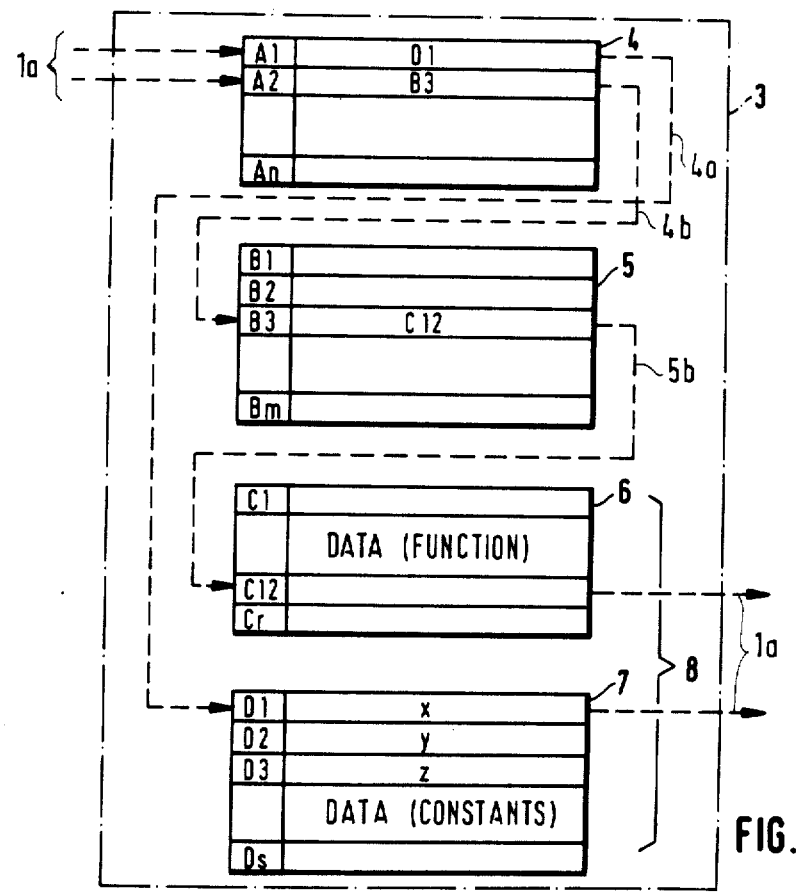

The external memory 3—see FIG. 2—is subdivided in a plurality of address fields and data fields. The subdivision is schematically shown in FIG. 2.

The external memory 3, as shown in FIG. 2. has an address field 4, a vector field 5, a function data field 6 and a constant data field 7. The function data field 6 and the constant data field 7 together form a common data field 8.

All constants specific to the particular ICE M are stored in the constant field 7 and have associated therewith fixed data addresses D1, D2 . . . Df. The function data field 6 stores specific functional relationships, which may be non-linear that is, providing specific output data when specific input values are provided. The addresses of the respective functions are stored under the data addresses C1, C2–Cr.

The address field 4 has initial addresses A1, A2 . . . An stored therein and, based on the initial addresses A1, A2 . . . An, the respective vector addresses B1, B2 . . . Bm, the constant data addresses D1, D2 . . . Ds and the function data addresses C1, . . . C12 . . . Cr. The vector addresses B1, B2 . . . Bm then direct the interrogation by the microprocessor 1 to the memory cells or locations of the vector field 5 in which, then, the data addresses C1 . . . Cr of the function field 6 are stored.

The sequence of the functional curves which are represented by a plurality of given input numbers are determined by the addresses B1 . . . Bm which, in turn, are stored in the initial address field 4, in the form of fixed initial addresses. The vector addresses B1 . . . Bm, stored in the address field 4, could be considered as control, or steering words, the value of which determines the specific vector address in the vector field 5. The vector field 5 then addresses the respective group of input data in the data field 6 from which the microprocessor then can load or read-out the corresponding output value (related to the specific input number then programmed by the microprocessor) for further processing in the microprocessor 1.

If, for example, a given microprocessor is to be operated at a later time with a different type of engine, which will have different operating characteristics, it is then only necessary to change the data and constants by only considering the values stored in the external memory 3. The basic program—for example associating ignition timing with engine temperature—will not change. It is thus only necessary to change the content of the initial address of the address field 4 in order, for example, to thereby change the value of a constant, to be recalled at the specific time in the program of the microprocessor 1, and stored in the constant data field 7. Change of the basic program 2 within the microprocessor 1 is not necessary.

The physical position of the function data field 6 and of the constant data field 7 can be easily changed via the associated data addresses and vector addresses in the address field 4 and in the vector field 5. It is also easily possible to shift the data within the data fields 6, 7, forming the overall data storage area or zone field 8.

Let it be assumed that, in accordance with a specific engine, a difference between data X, and Y, stored in a constant field 7 under data addresses D1 and D2 is required to be recalled by the microprocessor 1 to carry out a specific programming step. If the engine is changed, and the microprocessor is to be associated with a changed or different engine, the difference should then be determined between the datas X and Z, that is, between the data stored in data fields D1 and D3. Rather than reprogramming the microprocessor 1, it is only necessary to change the address in the address field 4 from the data address D2 to the data address D3 when the specific programming step is to be carried out, under control of the ROM 2 in the microprocessor 1. All other data, as well as the data within the memory 2, remain unchanged.

Similarly, recall of functional values stored in the data field 6 can easily be obtained by changing the address in the vector field 5.

The method and system thus is versatile and permits ready adaptation of data to specific operating units associated with a microprocessor, in the example shown in the ICE M with a given microprocessor 1, by merely changing the addresses in the external memory 3.

The method is based on these steps: the basic program, stored in the memory 2 of the microprocessor 1 initially addresses the initial addresses of the address or memory location field in the memory 2. The contents of the specific address of this program step are then transferred to the microprocessor. This program step will contain the initial address in the address field for the external memory 3. The initial address then will either directly—see broken line connection 4a, FIG. 2—address the respective data field 7, if the address step requires recall of a constant, or of an operation based on constants; or, if the program requires an operation based on functions, the address field A2, for example, will be addressed, which directs then the recall or read-out to, for example, the vector field 5—see line 4b of FIG. 2. The content of the vector address, for example in the field B3, then directs the interrogation to the specific group of data in the data field 6, as shown, schematically, in the example given to the data stored in the field C12, see broken line 5b in FIG. 2. The microprocessor, thus, will receive the data only when the addressing has been completed, that is, will receive the data stored in the data field C12. The data addresses stored in the vector field 5 thus permit addressing the characteristic or functional data in the data field 6, at the location C12. These functional data may, for example, be the relative relationship or output value with respect to numerical input values; any intermediate data between input values which are stored can be derived by interpolation in accordance with an interpolation program, as well known in the data processing field, and which can be carried out as a subroutine within the microprocessor 1, if the spacing between input numbers in the data field 6 is too wide for the specific output numbers desired.

Different characteristics can be interrelated such that a simple calculation, for example multiplication, addition, subtraction, forming of an exponent, root, or the like, of various characteristics then can form specific output characteristics. Such mathematical combination of characteristic curves, or rather, of specific output values with respect to given input values, are well known in the microprocessing field and can be simply programmed withn the microprocessor 1, for example under control of the memory 2. The data themselves are readily retrievable by suitable addressing of the address field 4 and/or the vector field 5. To change the output values with respect to given inputs, as required by the program of the microprocessor, controlled, for example, by the memory 2, it is only necessary to change the functional characteristics which are retrievable by changing the address in the address field which, then, directly or via the vector field 5, will provide respective output values based on changed operating characteristics.

In accordance with a preferred feature of the invention, the memory 3 is so contstructed that the respective data fields 6, 7 and, preferably, also the vector field 5, have excess storage cells, not initially programmed, but merely having addresses assigned thereto. This arrangement then permits expansion of the data to be stored so that specific apparatus operating data—be they constants or functions—can be added at a later time if it is desired to change engine characteristics or operating conditions and their functional relationships without, however, requiring a different program of the microprocessor 1. For example, the functional relationship between ignition timing and temperature may be different in an engine which is contemplated, but not yet designed; the programming step, however, to relate the ignition timing to engine temperature under given operating conditions will not change, however.

The split of the external memory 3 into an address field 4, a vector field 5, and a data field 8 which, preferably, again is split into a function field 6 and a constant field 7, permits construction of a memory with a much smaller number of memory cells, and a memory field with only a limited number of free, or unoccupied memory cells; a plurality of changes can be readily controlled by matching the retrieved data to the specific controlled apparatus, or ICE M in the example, as determined by specific engine or apparatus requirements, without, however, adding a multiplicity of additional data, requiring a substantial number of additional memory cells.

In an operating example, a suitable microprocessor for unit 1 is: INTEL 8057. The internal memory 2, to control the program, is inherent in the particular microprocessor 1; or a programming memory of the type CDP 5332 available from RCA may be used. The external memory 3, for example, suitably is: INTEL 2732A.

What is claimed is:

1. Electronic control system for control of at least one of fuel injection and fuel ignition in a combustion motor (M), particularly for control of an internal combustion engine (ICE), having a computer or microprocessor (1);
 a permanent program memory (2) containing a program for execution by the computer, and forming a part thereof;
 an external memory (3) containing data specific to the operation of the motor (M), connected to the computer for interrogation by the computer, to retrieve data therefrom in accordance with computation programs stored in the program memory (2) of the computer,
 a bus (1a) interconnecting said computer (1), program memory (2), and external memory (3) and said motor (M), for controlling said motor (M);
 wherein, in accordance with the invention,
 said computer (1) triggers at least one of fuel injection and fuel ignition by sending a control signal over said bus (1a) to said motor (M);
 the external memory (3) is an Eraseable Programmable Read-Only Memory (EPROM) and forms a combined address-and-data memory having
 at least one address field (4) connected to be addressed by the computer (1) in accordance with said program stored in the program memory (2) of the computer;
 a vector field (5);
 and a data field (8),
 the address field containing the address of at least one of:
 the vector field (5; B1, B2, . . . Bm); and
 the data field (8; 6: C1 . . . C12, Cr; 7: D1, D2 . . : Ds);
 wherein the vector field (5) contains data addresses of data in the data field (8; 6, 7); and wherein the data field (8; 6, 7) stores at respective addresses the operating data specific to the operation of the combustion motor (M);

said EPROM being capable of being erased and reprogrammed without modification of said permanent memory (2) in said computer (1).

2. System according to claim 1, wherein the data field (8) in the external memory (3) comprises a constant data field (7) to store fixed constant values, and a function data field (6) storing functional relationships;

and wherein the constant data field (7) is addressed directly from the address field (4) and the function data field (6) is addressed by the vector field (5), the vector field, in turn, being addressed by the address field.

3. System according to claim 2, wherein the external memory (3) comprises an erasable programmable read-only memory (EPROM).

4. Method of triggering at least one of fuel injection and fuel ignition in a motor (M), particularly an internal combustion engine, by a microprocessor or computer (1) having a bus connection (1a) to said motor (M) for controlling said motor (M), said computer having a program memory (2) which stores a program for execution by the computer or microprocessor, and in which data specific to the operation of the particular model of said motor are stored in an external memory (3), and are retrievable, as desired, under control of the program stored in the program memory, comprising the steps of providing a basic triggering program in the program memory (2), which program includes initial memory addresses (A1, A2, ... An) forming part of an address field (4) in the external memory (3);

providing, in an eraseable manner, data specific to the operation of at least one particular model of said motor in said external memory (3);

transferring said basic addresses to the microprocessor (1);

loading the contents of the respective initial addresses (A1, A2, ... An) of the address field of the external memory (3) into the microprocessor;

providing the address of at least one of:

a vector field (5; B1, B2, ... Bm) and a data field (8; 6: C1 ... C12, Cr; 7: D1, D2 ... Ds) in the external memory (3) and storing the addresses of the respective data field (8) or vector field (5) at the memory locations designated by the initial addresses of the address field (4);

loading into the microprocessor each respective address (D1, B3, ...) of the vector field or data field (5, 8), as stored in the memory locations corresponding to addresses (A1, A2, ... An) contained in said basic triggering program;

alternatively retrieving data (x) from the data field (8; 6, 7), if the address loaded (D1) is within said data field, or, it the address loaded (B3) is within said vector field (5), retrieving data from an address (C12) pointed to by a vector stored at the address (B3) in the vector field;

processing the retrieved data in the microprocessor; and triggering at least one of fuel injection and fuel ignition in said motor by generating a signal over said bus connection (1a) in accordance with said triggering program and said processing of the retrieved data, whereby execution of said steps may be modified, without altering said basic triggering program in said program memory (2), by providing modified data in at least one of said address field (4), said vector field (5), and said data field (8).

5. Method according to claim 4, wherein the data field (8) is subdivided into a constant data field (7) and a function or table data field (6);

and wherein said retrieval step comprises:

(1) retrieving constant data from the constant data field (7) based on addresses stored in the address field (4);

and retrieving data stored in the function field (6) based on the contents of addresses stored in the vector field, which addresses in the vector field, in turn, are derived from addresses stored in the address field (4).

* * * * *